United States Patent
Yeh et al.

(10) Patent No.: US 11,294,483 B2
(45) Date of Patent: Apr. 5, 2022

(54) ACTIVE STYLUS WITH TOUCH SENSOR

(71) Applicant: ELAN MICROELECTRONICS CORPORATION, Hsin-Chu (TW)

(72) Inventors: I-Hau Yeh, Hsinchu (TW); Hsian-Hong Wei, Zhubei (TW); Chih-Yu Lin, Taichung (TW)

(73) Assignee: ELAN MICROELECTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/990,533

(22) Filed: Aug. 11, 2020

(65) Prior Publication Data
US 2021/0064153 A1 Mar. 4, 2021

Related U.S. Application Data

(60) Provisional application No. 62/891,932, filed on Aug. 26, 2019.

(30) Foreign Application Priority Data

Mar. 19, 2020 (TW) .................................. 109109248

(51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/04162* (2019.05); *G06F 2203/0384* (2013.01)

(58) Field of Classification Search
CPC ......... G06F 2203/0384; G06F 3/03545; G06F 3/0383; G06F 3/04162
See application file for complete search history.

(56) References Cited

U.S. PATENT DOCUMENTS

2010/0252335 A1* 10/2010 Orsley .................. G06F 3/0442
178/18.03
2013/0050141 A1* 2/2013 Park ........................ G06F 3/044
345/174

(Continued)

FOREIGN PATENT DOCUMENTS

| CN | 107515685 A | 12/2017 |
| CN | 107643838 A | 1/2018 |
| TW | 201610763 A | 3/2016 |

OTHER PUBLICATIONS

Taiwanese Office Action in Application No. 109109248 dated May 26, 2021; pp. 1-5.

*Primary Examiner* — Chun-Nan Lin
(74) *Attorney, Agent, or Firm* — Muncy, Geissler, Olds & Lowe, P.C.

(57) ABSTRACT

An active stylus includes a stylus body and a touch sensor. The stylus body includes a first electrode and a pen body. The first electrode is used to send a signal. The pen body extends along a first direction. The touch sensor is provided on or in the pen body and includes a plurality of column electrodes extending along the first direction. There is a first gap between two adjacent column electrodes. Each column electrode has a first sensing electrode and a second sensing electrode. A first end of the first sensing electrode in the first direction has a recess to define a recess area. A second end of the second sensing electrode in the first direction has a projection extending into the recess area. There is a second gap between the projection and the recess. The second gap is smaller than the first gap.

8 Claims, 3 Drawing Sheets

(56) References Cited

U.S. PATENT DOCUMENTS

| | | | | |
|---|---|---|---|---|
| 2016/0179222 A1* | 6/2016 | Chang | ................... | G06F 3/0383 |
| | | | | 345/179 |
| 2016/0320913 A1* | 11/2016 | Gao | ................... | G06F 3/03545 |
| 2017/0068337 A1* | 3/2017 | Bhandari | ................ | H01G 5/12 |
| 2017/0108952 A1* | 4/2017 | Tang | ................... | G06F 3/03545 |
| 2018/0284946 A1* | 10/2018 | Yousefpor | ........... | G06F 3/03545 |
| 2019/0187810 A1* | 6/2019 | Alack, Jr. | ........... | G06F 3/03545 |
| 2020/0019275 A1* | 1/2020 | Gao | ................... | G06F 3/04166 |

\* cited by examiner

ACTIVE STYLUS WITH TOUCH SENSOR

This application claims priority for the U.S. provisional patent application No. 62/891,932 filed on 26 Aug. 2019, and Taiwan (R.O.C.) patent application no. 109109248 filed on 19 Mar. 2020, the content of which is incorporated by reference in its entirely.

TECHNICAL FIELD

The present invention relates to an active stylus and more particularly to an active stylus that has a touch sensing area.

BACKGROUND OF THE INVENTION

It is quite common for a touch electronic device to include a touch panel as its human-machine interface. A user of such an electronic device can input text or patterns into the device by writing or drawing on the touch panel with a stylus. There are two types of styluses, active stylus and passive stylus. An active stylus can be equipped with various elements. In addition to writing, active styluses have had more and more functions.

BRIEF SUMMARY OF THE INVENTION

One objective of the present invention is to provide an active stylus that has a touch sensing area.

According to the present invention, an active stylus includes a stylus body and a touch sensor. The stylus body includes a first electrode for sending a signal and a pen body that extends along a first direction. The touch sensor is provided on or in the pen body and includes a plurality of column electrodes that extend along the first direction. There is a first gap between two adjacent column electrodes. Each column electrode includes a first sensing electrode and a second sensing electrode, wherein the first sensing electrode has a first end in the first direction. The first end has a recess which defines a recess area. The second sensing electrode has a second end in the first direction. The second end has a projection extending into the recess area. There is a second gap between the projection and the recess, wherein the second gap is smaller than the first gap.

Since the projection of the second sensing electrode extends into the recess area of the first sensing electrode to form an interleaved pattern, a finger in contact with the projection of a second sensing electrode would also touch the first sensing electrode so that the contact position of the finger can be detected with higher accuracy.

DETAILED DESCRIPTION OF THE INVENTION

Figure 1:
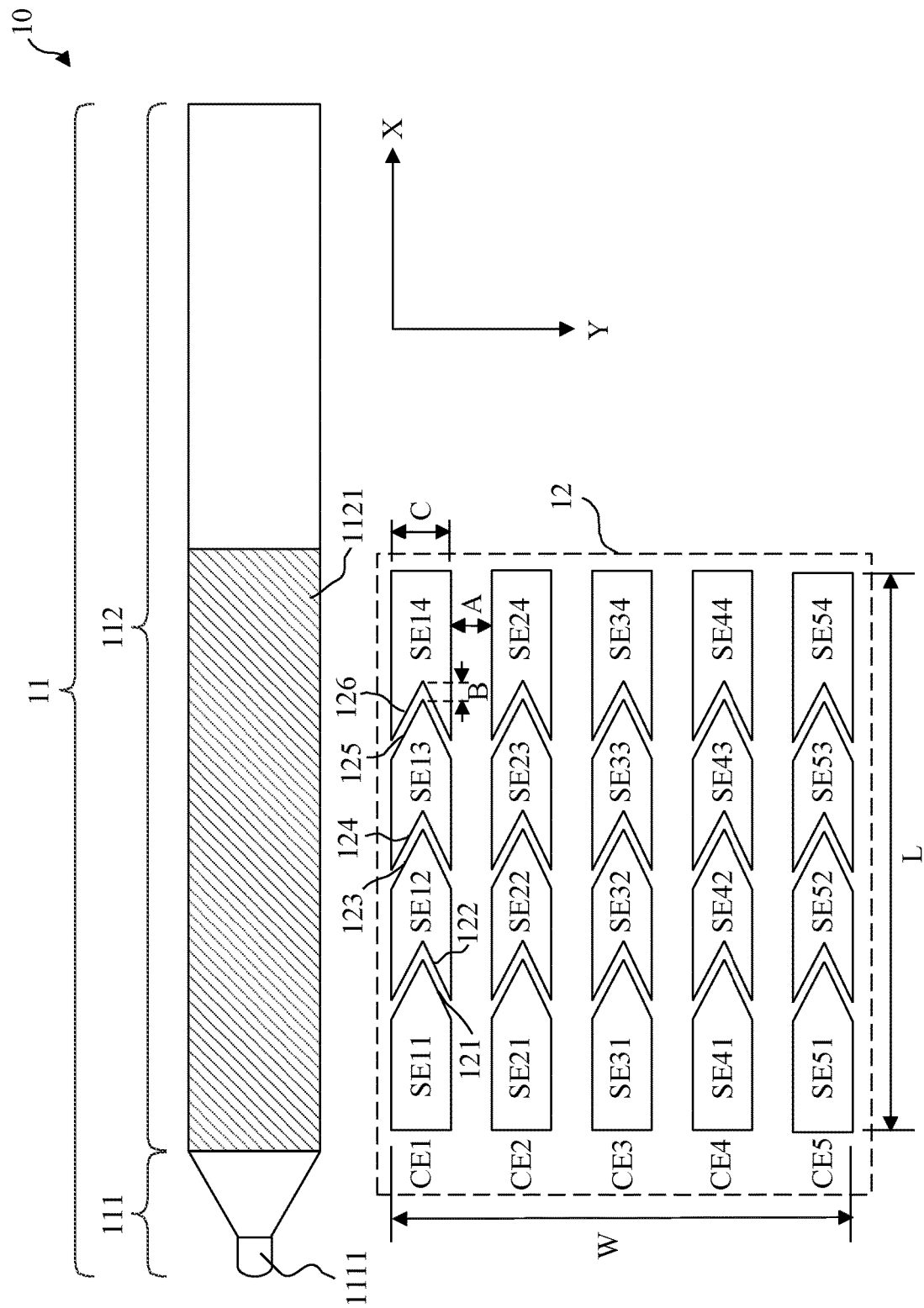
FIG. 1 shows an active stylus according to the present invention.

Referring to FIG. 1, an active stylus 10 according to the present invention includes a stylus body 11 and a touch sensor 12. The stylus body 11 includes a pen tip 111 and a pen body 112. The pen tip 111 has a first electrode 1111 for sending a signal. The pen body 112 extends along a first direction X and has a touch sensing area 1121. The touch sensor 12 is provided on the touch sensing area 1121 of the pen body 112 and extends along the entire circumference, or only a portion of the circumference, of the pen body 112. In one embodiment, the touch sensor 12 can be provided in the pen body 112. The length L of the touch sensor 12 may be, but is not limited to, 28.4 mm. The width W of the touch sensor 12 may be, but is not limited to, 21.8 mm. The touch sensor 12 includes a plurality of column electrodes CE1, CE2, CE3, CE4, and CE5 that extend along the first direction X. There is a first gap A between two adjacent column electrodes, and the first gap A may be, but is not limited to, in a range of 2 to 2.5 mm. In one embodiment, the first gap A is 2 mm. The column electrodes CE1, CE2, CE3, CE4, and CE5 in FIG. 1 have the same structure, so only the column electrode CE1 is described below by way of example. The column electrode CE1 includes a plurality of sensing electrodes SE11, SE12, SE13, and SE14. The sensing electrodes SE12, SE13, and SE14 have first ends 122, 124, and 126 respectively in the first direction X, and each of the first ends 122, 124, and 126 has a recess to define a recess area. The recess area is the space formed by the recess. The sensing electrodes SE11, SE12, and SE13 have second ends 121, 123, and 125 respectively in the first direction X, and each of the second ends 121, 123, and 125 has a projection that extends into the recess area of the adjacent sensing electrode SE12, SE13, and SE14. In other words, two adjacent sensing electrodes of the same column electrode are interleaved with each other. There is a second gap B between the projection of each of the sensing electrodes SE11, SE12, and SE13 and the recess of the adjacent sensing electrode SE12, SE13, or SE14. More specifically, the second gap B is an interval between an edge of the projection of the sensing electrode SE11, SE12, or SE13 and an edge of the recess of the adjacent sensing electrode SE12, SE13, or SE14. The second gap B is smaller than the first gap A. The second gap B may be, but is not limited to, in a range of 0.3 to 0.61 mm. The width C of the sensing electrodes SE11, SE12, SE13, and SE14 may be, but is not limited to, in a range of 2.5 to 3 mm. In one embodiment, the width C is 2.76 mm. In the embodiment shown in FIG. 1, each of the column electrodes CE1, CE2, CE3, CE4, and CE5 includes four sensing electrodes. In another embodiment, however, each of the column electrodes CE1, CE2, CE3, CE4, and CE5 may include only two sensing electrodes instead. The invention has no intention to limit the number of the sensing electrodes of each column electrode.

Figure 2:
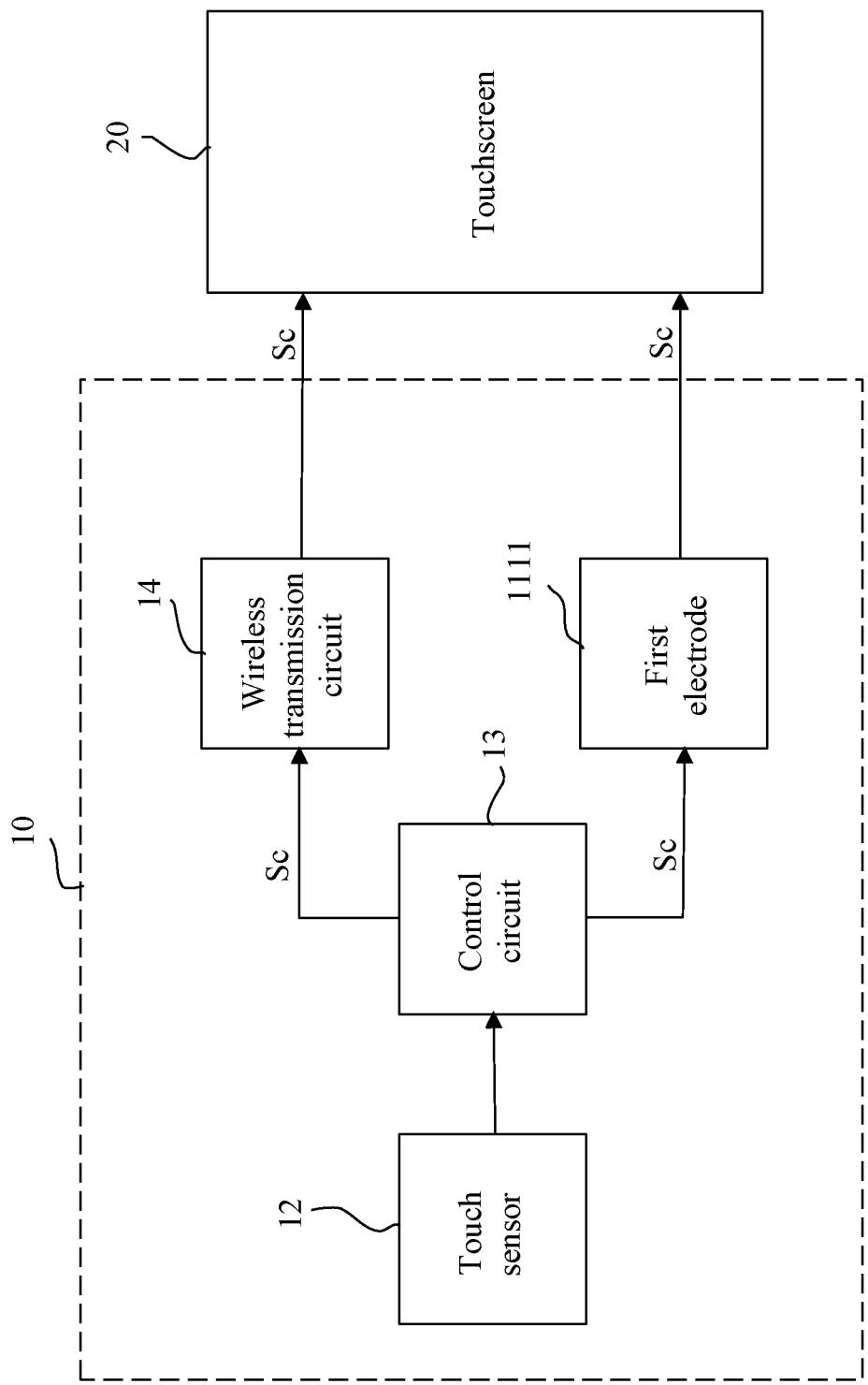
FIG. 2 shows the circuitry of an active stylus according to the present invention.

FIG. 2 is a block diagram of an embodiment of the present invention and shows additional elements of the active stylus 10. The active stylus 10 further includes a control circuit 13 that is coupled to the touch sensor 12, a wireless transmission circuit 14, and the first electrode 1111. The control circuit 13 generates a first signal Sc according to the operation performed on the touch sensor 12 and sends the first signal Sc to a touchscreen 20 via the wireless transmission circuit 14 or the first electrode 1111. The control circuit 13 is provided in the pen body 112 and is coupled to the plurality of sensing electrodes SE11~SE54 of the touch sensor 12 through multiple conductive wires (not shown) respectively. The control circuit 13 obtains the sensing value of each sensing electrode SE11~SE54 so as to calculate the contact position or determine the operation of the user's finger on the touch sensor 12 (e.g., clicking or sliding). Each sensing electrode SE11~SE54 in FIG. 1 is electrically connected to the control circuit 13 individually. The control circuit 13 detects the touch sensor 12. The control circuit 13 calculates the contact position according to the variation of the sensing value of each sensing electrode SE11~SE54 of the touch sensor 12. Or, the control circuit 13 generates the first signal Sc corresponding to the detected user operation on the touch sensor 12 (e.g., the user's finger moving in the first direction X). The first signal Sc may be a command or information related to the user operation on the touch sensor 12. The first signal Sc generated by the control circuit 13 may be sent to the touchscreen 20, which is outside of the active stylus 10, through either the wireless transmission circuit 14 or the first electrode 1111. The touchscreen 20 will execute a corresponded operation according to the received first signal Sc, e.g., changing the color, thickness, etc. of the line shown in the touchscreen 20 in response to the operation of the active stylus 10. In one embodiment, the wireless transmission circuit 14 is Bluetooth-based.

Figure 3:
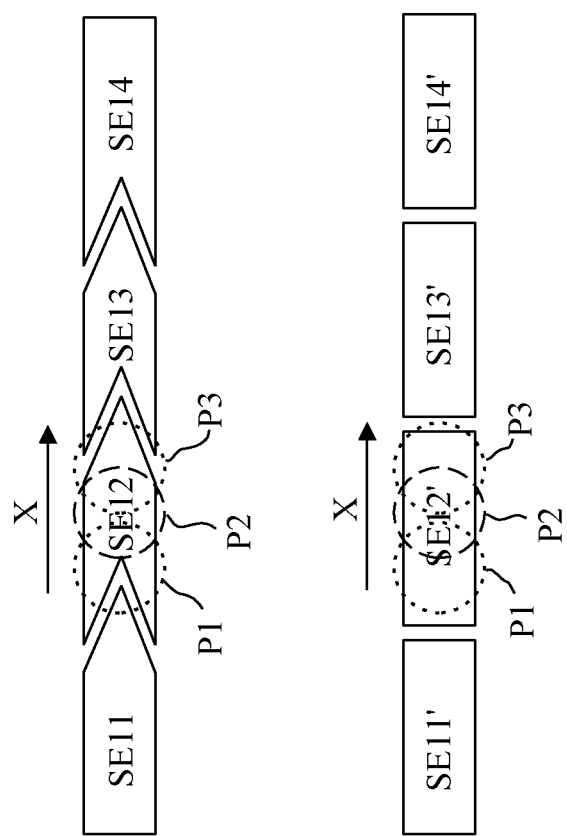
FIG. 3 shows the difference between an interleaved configuration and a non-interleaved configuration of sensing electrodes.

In the touch sensor 12 in FIG. 1, two adjacent sensing electrodes of the same column electrode are interleaved with each other, and this helps increase the accuracy of contact position calculated by the control circuit 13. FIG. 3 shows the configuration of the sensing electrodes SE11, SE12, SE13, and SE14 of the present invention. In FIG. 3, a finger sequentially touches three positions P1, P2, and P3 of the sensing electrode SE12 that are arranged along the first direction X. When the finger is at the position P1, both the sensing electrodes SE11 and SE12 are touched by the finger. Based on the sensing values of the sensing electrodes SE11 and SE12, the control circuit 13 determines that the finger is at the left end of the sensing electrode SE12. Once the finger is moved from the position P1 to the position P2, only the sensing electrode SE12 is touched by the finger. As a result, the sensing value of the sensing electrode SE11 is 0. The control circuit 13 determines that the finger only contacts with the sensing electrode SE12 and the contact position is at P2. According to the detected positions P1 and P2, the control circuit 13 also determines that the finger has been moved along the first direction X to the right. Once the finger is moved from the position P2 to the position P3, both the sensing electrodes SE12 and SE13 are touched by the finger. Based on the sensing values of the sensing electrodes SE12 and SE13, the control circuit 13 determines that the contact position of the finger is at the right end of the sensing electrode SE12, namely at the position P3. If, however, the sensing electrodes are not interleaved, as shown by the sensing electrodes SE11', SE12', SE13', and SE'14 in FIG. 3, a finger at any of the positions P1, P2, and P3 will touch only the sensing electrode SE12' such that the control circuit 13 detects only a variation of the sensing value of the sensing electrode SE12'. So the control circuit 13 cannot determine whether the finger is at the right end, in the middle, or at the left end of the sensing electrode SE12'. Furthermore, when the finger is moved from the position P1 to the positon P2 or from the position P2 to the position P3, the control circuit 13 will detect the same sensing value and hence determine that the finger does not move. It can be understood from the above that the pattern of the touch sensor 12 in the present invention is helpful to enhance accuracy of touch detection. Although the accuracy of touch detection can enhance by shortening the lengths of the sensing electrodes SE11', SE12', SE13', and SE14', the number of the sensing electrodes covering the same area will increase. Consequently, the cost will increase.

According to the present invention, two adjacent column electrodes need not be very close to each other because in most cases a user's finger on the touch sensor 12 is moving along the direction X. Therefore, making the first gap A larger than the second gap B not only will not affect user operation, but also reduces the number of the column electrodes, such that the cost is reduced and the number of the pins of the control circuit 13 which are used to connect with the sensing electrodes of the touch sensor 12 are decreased.

The foregoing description of some preferred embodiments of the present invention serves illustrative purposes only and is not intended to limit the invention precisely to the forms disclosed herein. It is possible to modify or vary the aforesaid embodiments according to the teaching given above or after learning from those embodiments. The embodiments are chosen and described to expound the principle of the invention and to enable a person skilled in the art to implement the invention in various ways. The technical concept of the invention shall be defined by the appended claims and their equivalents.

What is claimed is:

1. An active stylus, comprising:
   a stylus body including a first electrode for sending a signal and a pen body extending along a first direction, wherein the first direction is a length direction of the pen body; and
   a touch sensor, which is a part of the active stylus, provided on or in the pen body and including a plurality of column electrodes extending along the first direction, wherein there is a first gap between two adjacent column electrodes, and each said column electrode includes:
      a first sensing electrode having a first end in the first direction, wherein the first end has a recess which defines a recess area; and
      a second sensing electrode having a second end in the first direction, wherein the second end has a projection extending into the recess area such that the first sensing electrode and the second sensing electrode are interleaved with each other, there is a second gap between the projection and the recess, and the second gap is smaller than the first gap.

2. The active stylus of claim 1, wherein the second gap is in a range of 0.3 to 0.61 mm.

3. The active stylus of claim 1, wherein each said first sensing electrode and each said second sensing electrode have a width in a range of 2.5 to 3 mm.

4. The active stylus of claim 1, wherein the first gap is in a range of 2 to 2.5 mm.

5. The active stylus of claim 1, further comprising:
   a control circuit electrically connected to the first sensing electrode and the second sensing electrode of each said column electrode individually and configured to generate a first signal according to an operation performed by an object on the touch sensor.

6. The active stylus of claim 5, further comprising a wireless transmission circuit coupled to the control circuit and configured to send the first signal outside of the active stylus.

7. The active stylus of claim 5, wherein the control circuit is coupled to the first electrode and sends the first signal to an outside of the active stylus through the first electrode.

8. The active stylus of claim 1, wherein the touch sensor has a length of 28.4 mm and a width of 21.8 mm.

* * * * *